United States Patent [19]
Lieb et al.

[11] Patent Number: 6,115,678
[45] Date of Patent: *Sep. 5, 2000

[54] UNIVERSAL HOST INTERFACE FOR DATA ACQUISITION SYSTEMS

[75] Inventors: Robert Lieb, Bohemia; Nicholas Buongervino, Hauppauge; Patrick Mauro, Lake Grove; Michael Rizzi, N. Babylon; Ellen Oppenheim, Coram; Joseph Boriotti, E. Northport; Robert May, Sayville, all of N.Y.; Sara Karcher, Boise, Id.; Anthony Biuso, S. Setauket, N.Y.; Paul R. Poloniewicz, E. Setauket, N.Y.; Daniel Brown, E. Northport, N.Y.; Anthony Fama, Mastic, N.Y.; Robert Stein, Plainview, N.Y.; Cary Chu, Lake Grove, N.Y.; Michael Catalano, Lindenhurst, N.Y.; Altaf Mulla, Merrick, N.Y.

[73] Assignee: Symbol Technologies, Inc., Holtsville, N.Y.

[ * ] Notice: This patent is subject to a terminal disclaimer.

[21] Appl. No.: 09/255,663

[22] Filed: Feb. 23, 1999

Related U.S. Application Data

[63] Continuation of application No. 08/932,496, Sep. 18, 1997, Pat. No. 5,875,415, and a continuation of application No. 08/439,833, May 12, 1995, abandoned.

[51] Int. Cl.$^7$ ........................................... H03M 5/06
[52] U.S. Cl. ................................... 702/122; 702/91
[58] Field of Search ..................... 702/90, 91–122; 235/375, 462, 463; 364/932.62, 238.3, 239, 514 R, 514 C; 395/836, 883

[56] References Cited

U.S. PATENT DOCUMENTS

| | | | |
|---|---|---|---|
| 4,500,933 | 2/1985 | Chan | 360/69 |
| 5,258,604 | 11/1993 | Behrens et al. | 235/462.15 |
| 5,493,106 | 2/1996 | Hunter | 705/408 |
| 5,548,510 | 8/1996 | Ebert et al. | 701/200 |
| 5,875,415 | 2/1999 | Lieb et al. | 702/122 |

OTHER PUBLICATIONS

Instrumentation For Engineering Measurements Dally et al. John Wiley & Sons, Inc Publisher, pp 99–104, 1993.

MicroSoft Press Computer Dictionary 2nd Edition Woodcock et al. Publisher: Microsoft Press, 1993.

Donald Watts, I. Davies (Davies et al.) Computer Networks and Their Protocols,1979, pf 4, John Wiley & Sons Ltd.

*Primary Examiner*—Marc S. Hoff
*Assistant Examiner*—Craig Steven Miller
*Attorney, Agent, or Firm*—Gary Serbin

[57] ABSTRACT

A universal interface system for use with a data acquisition system including a data acquisition device such as a bar code scanner or scanner integrated terminal for providing digital data signals indicative of acquired data for transmission to a host device such as a computer, and a host device having host-specific input/output data format requirements. The universal interface system comprises universal data exchange means located in the data acquisition device for providing digital data signals in a universal data exchange format independent of the data format requirements of the host device; and a host interface cable coupled to the data acquisition device and to said host device, for transmitting acquired digital data from the data acquisition device to the host device, the interface cable comprising means for translating digital data from the universal data exchange format to the host-specific input/output data format requirements. The interface cable comprises a buffer for storing a host parameter data word used in communications with the host device. The universal data exchange means comprises a memory for storing a plurality of host parameter data words, each of the host parameter data words being associated with one of a plurality of different host interface modules; and means for reading from the memory and transmitting to the host interface module the host parameter data word associated with the particular host interface module operatively connected thereto.

1 Claim, 7 Drawing Sheets

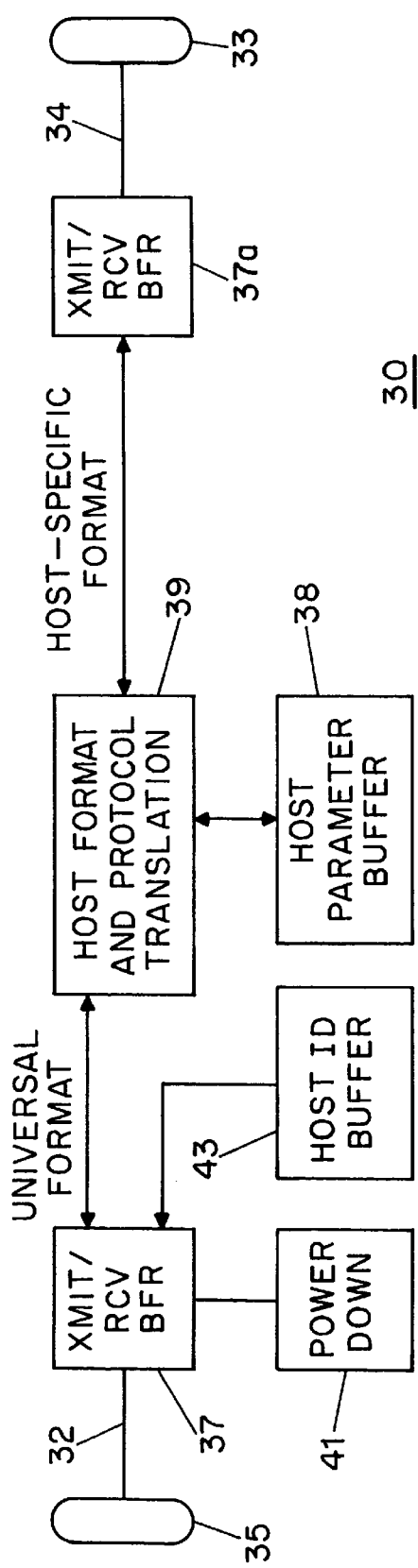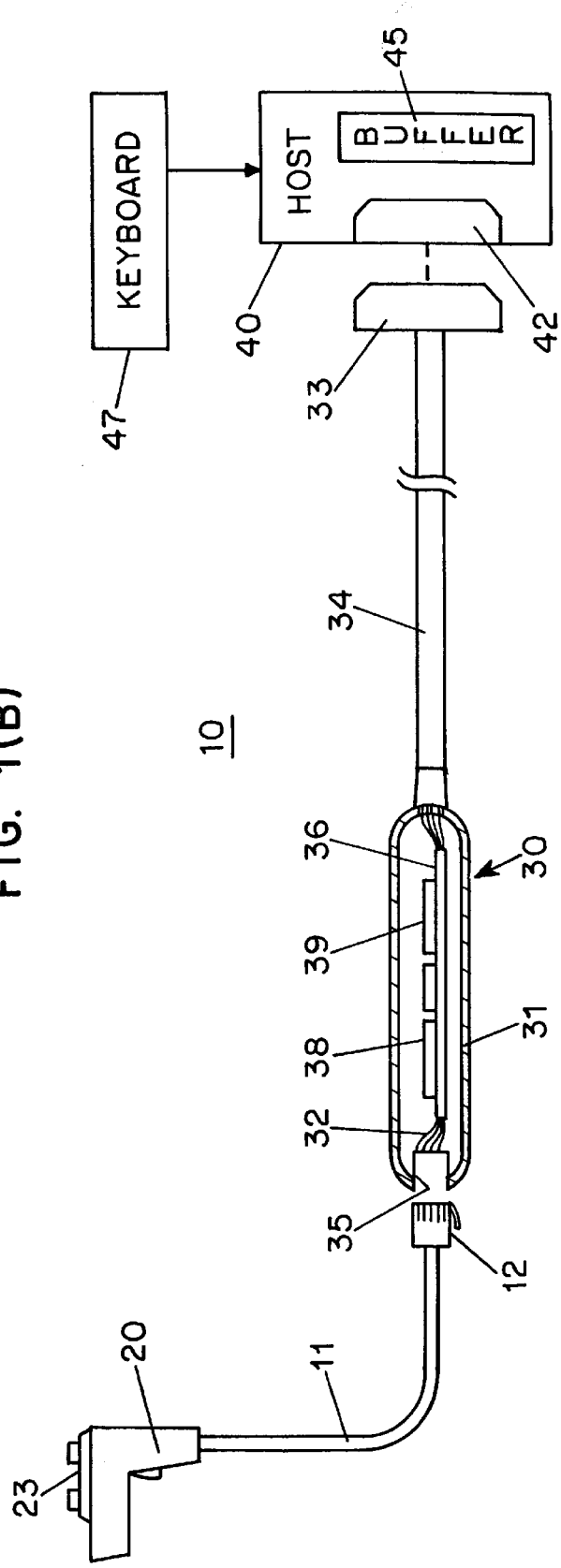

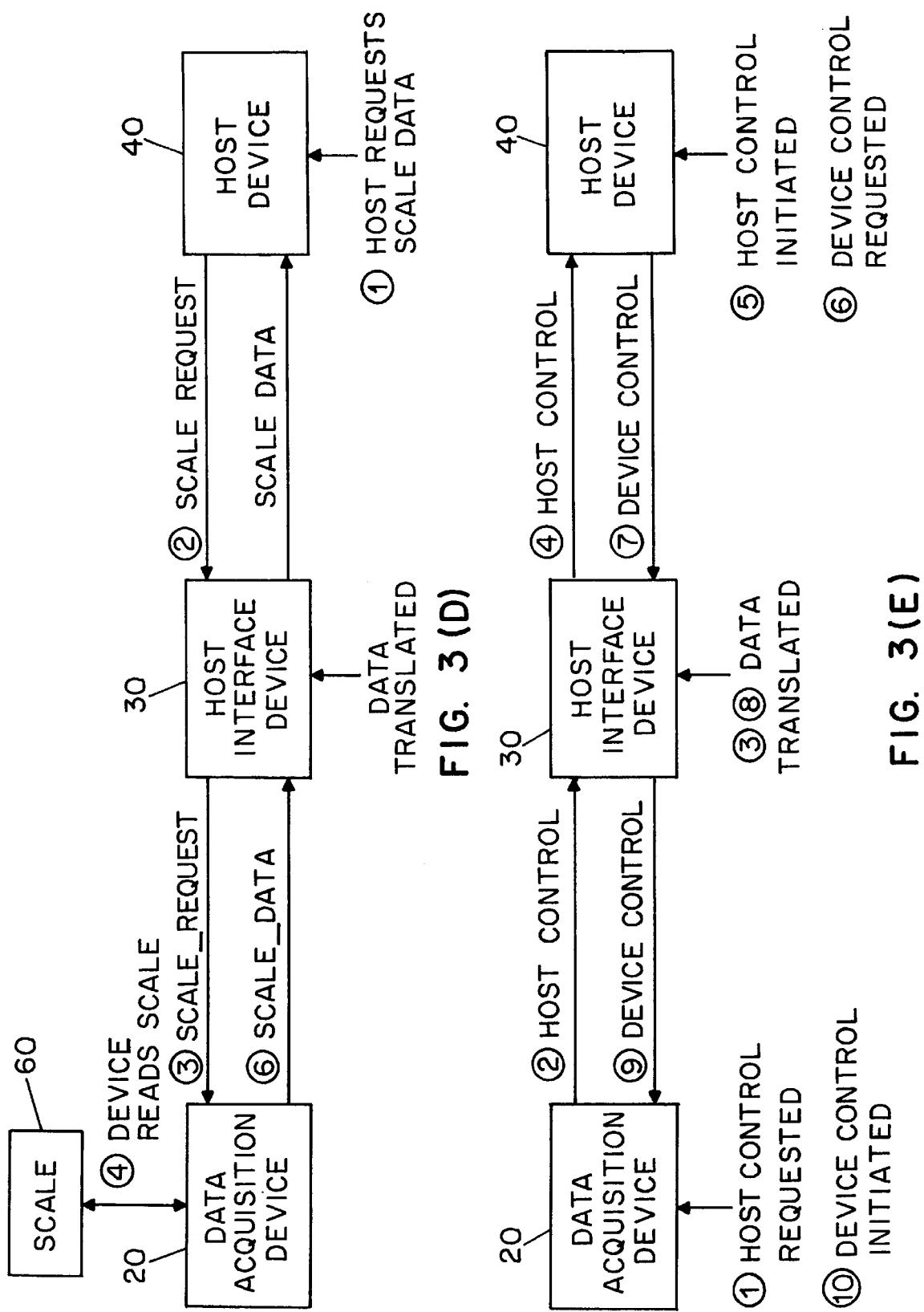

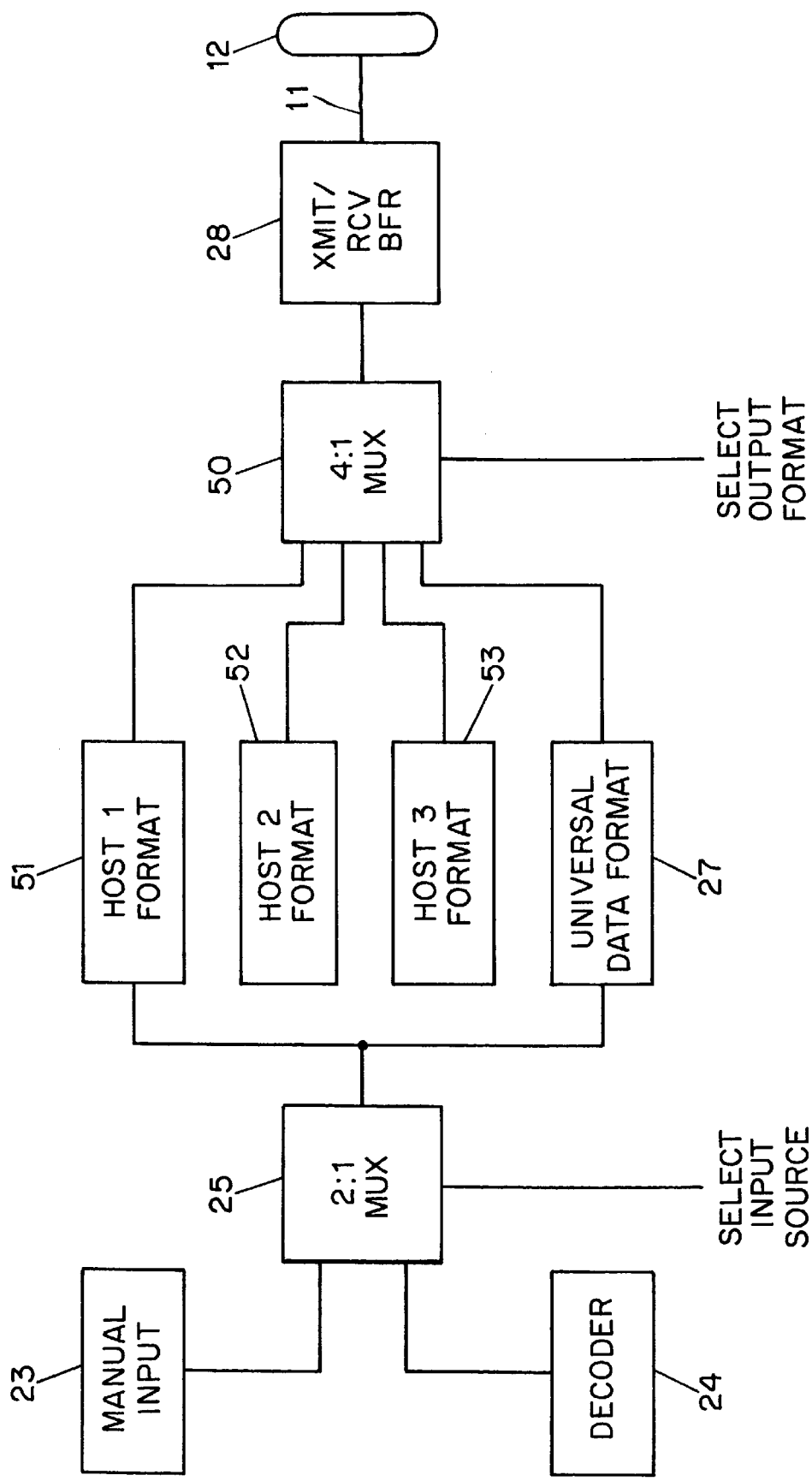

UNIVERSAL HOST INTERFACE FOR DATA ACQUISITION SYSTEMS

This is a cont. of Ser. No. 08/932,496 filed Sep. 18, 1997 now U.S. Pat. No. 5,875,415 and a cont. of Ser. No. 08/439,833 filed May 12, 1995, now abandoned.

BACKGROUND OF THE INVENTION

1. Field of the Invention

This invention relates to a universal host interface system for data acquisition devices such as bar code scanners and in particular to such a system which implements a programmable cable interface device to couple a universal and generic data acquisition device interface to a specific host device.

2. Description of Related Art

Various types of data acquisition devices exist which allow a user to collect and transmit data to a host computing device. Data acquisition devices may be terminals, with keypad entry means and a display. In addition, data acquisition devices may be bar code scanners in a stand alone configuration or integrated with a terminal. Various types of bar code scanning devices are known in the art which optically scan a bar code printed on a substrate for capture of data encoded in the bar code. Laser bar code scanning devices use a laser light source such as a visible laser diode to scan the bar code by sweeping the laser source across the bar code with a mechanically oscillating reflecting element such as a mirror. The light reflected from the bar code is collected by a photosensor directly from the bar code or retroreflectively off of a portion of the scanning mirror. The analog waveform output by the photosensor has an amplitude which represents the amount of laser light reflected off the bar code. Thus, the varying amplitude of the analog waveform represents the relative spacing of the various bars and spaces of the bar code, which in turn represents the data encoded therein. The analog signal is processed, digitized and decoded into data representative of that which had been encoded into the target bar code.

Bar code scanning devices are also known in the art which are based on solid state imagers such as charge coupled devices (CCDs). CCD based bar code readers are either one-dimensional or two-dimensional. One-dimensional CCD bar code scanners use a linear array of photosensors to capture an image of a cross section of the entire linear bar code at once and produce an analog waveform whose amplitude is representative of the darkness and lightness of the bars and spaces of the captured image. The electric charge stored in each element of the CCD array as a function of the amount of light sensed by an area covered by each element is shifted out serially to form electric signals for further processing, digitizing and decoding. Two dimensional CCD bar code readers operate similarly to capture an image of an entire two-dimensional bar code symbol at once and process it accordingly. The waveform is digitized and decoded in a means similar to laser scanners.

The decoded signals are typically transmitted to a host device for processing, storage, and the like. Many types of host devices exist, depending on the particular application desired by the user. For example, scanners are used at POS cash register terminals to scan in the bar code of a product, where the terminal uses the bar code data as a pointer to look up the price and item description in memory. Scanners are also used to interface to personal computers with keyboard wedges, where the scanner is inserted in the path between the keyboard and the computer, and the scanner input must be configured to appear the same to the computer as keyed input from the keyboard. Scanners are also used to drive RS-232 computer interfaces in other applications.

In most cases, each different type of host device implements a different type of input/output interface, thus requiring different mechanical connectors, different electrical and data formats and protocols, etc. depending on the user's application. Prior art devices were thus usually configured by the manufacturer to interface with one or more host devices. This custom type of scanner-host device matching is costly and inefficient.

In U.S. Pat. No. 5,258,604, a system is suggested which implements a bar code scanning device which is configured to accept any of a plurality of differently configured interface boards in its handle, wherein each type of interface board is specially adapted to mate with an associated host device. The decoder in the scanner polls the interface board upon power-up and reads an identification code from the particular interface board which the user has inserted. The identification code is used by the decoder to access configuration and formatting data from an on-board memory in order to transmit data to the interface board and ultimately to the host device in the required manner. This requires a user to have to swap electrical boards inside the scanner device whenever he desires to use the scanner with a different host device, which is unwieldy and potentially damaging to the boards due to electrostatic discharge (ESD) phenomena. In addition, when a new type of host device is desired to be used with a scanner already in use in the field, the scanner must be physically reconfigured in order to be able to recognize a new identification code from a new type of interface board and to properly format the decoded data for transfer to the new type of host device. Thus, this type of data acquisition device system is not readily upwards compatible with new host devices with which it may be desired to be connected.

It is also desired in the field of data acquisition such as bar code scanning to be able to use a particular data acquisition device with different host devices at different times by simply connecting the data acquisition device to the host device in a "plug and play" environment, without having to physically reconfigure the data acquisition device with different internal interface boards as in the prior art. This may occur, for example, with a data acquisition device that is used to scan bar codes during the daytime at a POS terminal, and then is used at night time for inventory collection purposes in a storage room with a different host device. Further, even if the two host devices are of the same type and configuration (thus using the same interface), the user may operate the scanner and/or host devices in different ways depending upon the location. Rather than having to reprogram the scanner every time a different host is connected (usually by scanning in various "parameter bar codes"), it is desirable for the scanner to retain its operating parameters and implement them automatically in accordance with the connected host device or in accordance with the scanning of a "location defining" bar code.

It is therefore an object of the present invention to provide a modular and universal data acquisition system which overcomes these and other problems of the prior art.

It is a further object of the present invention to provide a modular and universal data acquisition system in which the data acquisition device which does not need to be reconfigured in order to communicate with different host devices.

It is a further object of the present invention to provide such a system in which the data acquisition devices are upwards compatible and will communicate with newly designed host devices without the need for reconfiguration.

It is a further object of the present invention to provide such a system in which the host devices are upwards compatible and will communicate with newly designed data acquisition devices without the need for reconfiguration.

It is an even further object of the present invention to provide such a system in which the data acquisition device may easily and conveniently be used with any number of differently or similarly configured host devices without the need for the user to manually change operating parameters depending on the host device to which it is connected.

It is further object of the present invention to provide such a system which advantageously implements an intelligent cable interface device in order to provide communications formatting and protocol between an associated host device and any type of data acquisition device.

SUMMARY OF THE INVENTION

In accordance with these and other objects, provided is a universal interface system for use with a data acquisition system including a data acquisition device for providing digital data signals indicative of acquired data for transmission to a host device, and a host device having host-specific input/output data format requirements. The universal interface system comprises universal data exchange means located in the data acquisition device for providing digital data signals in a universal data exchange format independent of the data format requirements of the host device; and a host interface module coupled to the data acquisition device and to said host device, for transmitting acquired digital data from the data acquisition device to the host device, the interface module comprising means for translating digital data from the universal data exchange format to the host-specific input/output data format requirements. The interface module comprises a buffer for storing a host parameter data word used in communications with the host device. The universal data exchange means comprises a memory for storing a plurality of host parameter data words, each of the host parameter data words being associated with one of a plurality of different host interface modules; and means for reading from the memory and transmitting to the host interface module the host parameter data word associated with the particular host interface module operatively connected thereto.

The data acquisition device comprises means for entering host parameter data words by a user. In embodiments wherein the data acquisition device comprises a bar code scanner capable of electro-optically reading bar code symbols encoded with bar code data and providing a digital bar pattern representative of bars and spaces comprising said bar code symbol, the bar code scanner comprising a decoder for converting said digital bar pattern into said digital data signals, the decoder of the invention further comprises means for determining if the digital bar pattern is representative of a host parameter data word, and means for storing in the memory the host parameter data word for subsequent transfer to the host device.

The system of the present invention undergoes an initialization routine wherein the universal data exchange means requests an identification code from the host interface module, the host interface module provides in response thereto an identification code stored therein, the universal data exchange means utilizes the provided identification code to read from said memory the host parameter data word associated with the identification code, the universal data exchange means transmits to the host interface module the host parameter data word read from said memory, and the host interface module overwrites the default mode with the host parameter data word provided by the universal data exchange means and operates in accordance with the host parameter data word.

BRIEF DESCRIPTION OF THE DRAWINGS

FIGS. 1(a) and 1(b) are a block diagram of the preferred embodiment system of the present invention;

FIG. 2. is a pictorial diagram of the system of FIG. 1;

FIGS. 3(a) to 3(e) are functional diagrams illustrating the data exchange protocol of the system of FIG. 1;

FIG. 5 is a block diagram of an alternative embodiment of the present invention.

DETAILED DESCRIPTION OF THE PREFERRED EMBODIMENT

Figure 1A:
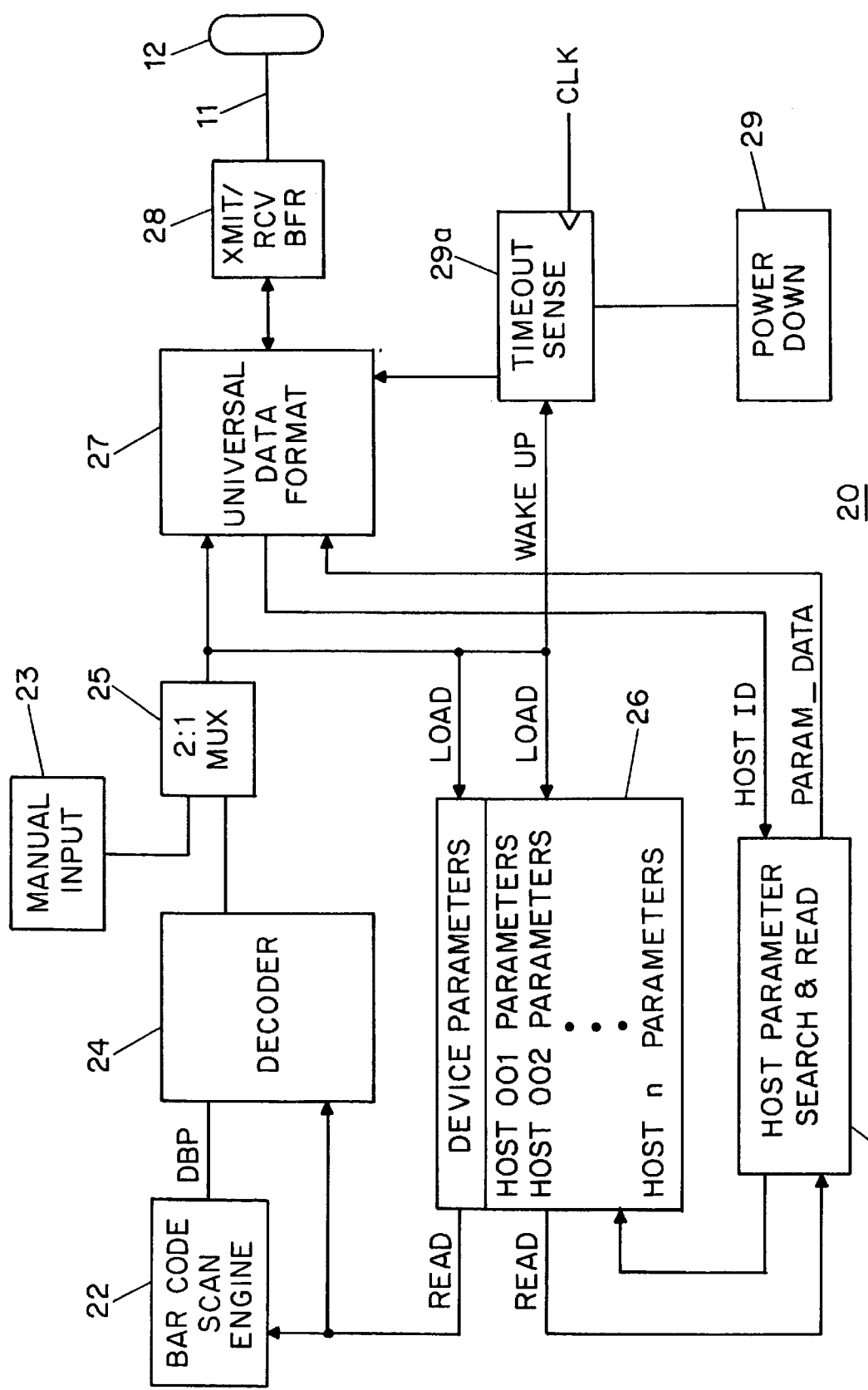

The preferred embodiment of the present invention will now be described in detail. FIGS. 1(a), 1(b) and 2 illustrate the preferred embodiment data acquisition system 10 which comprises a data acquisition device 20, a host interface cable 30, and a host device 40. The host device 40 may be any type of computing device known in the art which is configured to accept data input in any type of format, such as a computer with an RS-232 communications port, an Optically Coupled Interface Adapter device (OCIA), a keyboard wedge configuration (as in a personal computer), or an IBM 4683 POS device, any of which will accept bar code data obtained when the data acquisition device 20 implements bar code scanning (or acquires data by other means such as magnetic stripe reading, keyed input, etc.).

The data acquisition device 20 is configured in the present invention in a generic manner, and has a standard interface protocol which is referred to herein as SDCI (Standard Data Communications Interface). The data acquisition device 20 in the preferred embodiment is a scanner integrated terminal and comprises a bar code scan engine 22 and a decoder 24. The bar code scan engine 22 may be of any type known in the art as described above which produces a digitized signal (digital bar pattern DBP) which is representative of the relative spacing of the bars and spaces of the bar code which is scanned. The decoder 24 may also be of any type known in the art which operates on the digital bar pattern via various algorithms stored in an associated memory in order to decode the digital bar pattern to a digital data signal in accordance with the particular symbology being implemented. The decoder 24 may be configured to decode bar code symbols in any one symbology desired, or it may be configured in an autodiscrimination mode to automatically detect and decode bar codes of more than one symbology and provide the digital data accordingly. A manual input device 23 such as a keypad is provided, along with the decoder 24 output, to a multiplexer 25 which provides the selected data signal to a universal data formatting means 27. The universal data formatting means 27 uses the digital data from the selected source and formats it in the SDCI protocol, to be described below, for output via a transmit/receive buffer 28, which performs electrical communication with the host device 40 via the host interface cable 30, which is coupled to a data acquisition device cable 11 and data acquisition device connector 12. Importantly, the data transmitted by the buffer 28 is in the universal, non-host specific SDCI protocol which is common to all types of data acquisition devices recognized by the data acquisition system 10. Thus, any type of data acquisition device 20 configured in the SDCI protocol will be usable in the system 10 without having to perform any type of reconfiguration, reprogramming or the like. This "plug-and-play" mode allows users to easily switch data acquisition devices within a given system, in accordance with their needs, and it allows upwards compatibility with new data acquisition devices as they are designed and manufactured in accordance with the universal SDCI protocol.

A parameter memory 26 comprises non-volatile electrically reprogrammable memory space (e.g. a non-volatile RAM) for storage of certain operating parameters of both the data acquisition device 20 as well as the host interface cable 30, as will be further described below. These parameters may optionally be programmed by the user by entering either manually or by scanning a dedicated parameter bar code from a menu provided with the system 10. By scanning an operating parameter bar code, preset default values for the specified functions are overridden. For example, if the user wishes to instruct the data acquisition device to use a soft beeper tone rather than the preset default tone, he may scan in a preprinted parameter bar code provided with the system, which is detected by the decoder to be an operating parameter rather than data and which is then routed to and stored in an appropriate location in the parameter memory 26. This parameter will control operation of the tone generator used to signal the user when a bar code has been detected. If the user wishes to again change this parameter (e.g. increase the volume of the tone), he simply scans in an appropriate preprinted bar code and the parameter is updated in the memory 26 for subsequent use.

In addition to storing various data acquisition device parameters, the parameter memory 26 may be used to store optional parameters relating to the operation of the host interface cable 30 and the host device 40. Importantly, these parameters are only optional, and are not required to be used in order for the data acquisition device 20 and the host device 40 to communicate with each other. That is, a set of default values, to be described below, is preset in the interface cable 30, which controls the operation of the system communications without requiring operator programming.

The parameter memory 26 is capable of storing parameter data in individual locations for each type of host device 40 which may be connected thereto. A host parameter search and read means 21 is used by an initialization process to search through the memory 26 to look for parameter data matched to its associated host 40. In this way, an interface cable 30 may access specific user-defined parameters in order to override system defaults set in the cable 30. As a result, the data acquisition device 20 may be used with any type of host/cable system, and the particular interface cable 30 to which it is connected will fetch from the parameter memory 26 the operating parameters with which it is associated. The data acquisition device 20 thus functions as a "dumb" memory device for storage of the host parameters. That is, the data acquisition device 20 need know nothing about the effect of the host parameters which it downloads to the interface cable 30.

The functions of the universal data formatting means 27 and the host parameter search means 21 may be advantageously implemented by an embedded system such as a microprocessor device programmed to perform such functions. Such implementation is known in the art and need not be described in detail.

A power down circuit 29 controls the operating power used by the components in the data acquisition device 20 and will lower the operating power requirements when instructed by a timeout sense circuit 29a or by command from the host device 40 as will be described below. This allows the data acquisition device 20 to enter a "sleep" mode whenever no data has been acquired in a certain timeout period (e.g. 3 minutes) or when desired by the user of the host device 40. The sleep mode is exited whenever data is input by the acquisition device 20 or upon command by the host device 40.

The interface cable 30 functions as the host-specific link from the universal SDCI output of the data acquisition device 20 to the particular host device 40 with which it is associated. Each different type of host device 40 will require the use of a differently configured interface cable 30 in order to be able to communicate properly with a data acquisition device 20. The interface cable 30 comprises an SDCI bus 32 coupled to a processing board 36. The processing board 36 is embedded within a plastic housing 31 as shown in FIG. 2. The interface cable 30 also comprises a host link 34, which is coupled to the processing board 36 and has an interface/host connector 33 which is designed to mechanically and electrically mate with an associated host connector 42 found on the host device 40.

In operation, the data acquisition device 20 is coupled to the interface cable 30 by inserting the data acquisition device connector 12 into the mating interface/device connector 35, and the interface cable 30 is coupled to the host device 40 by inserting the interface/host connector 33 into the mating host connector 42. The interface cable 30 is configured, by appropriate circuitry within host format and protocol translation means 39, to communicate with the particular host device 40 to which it is connected. Functionally, the interface cable 30 comprises the host format and protocol translation means 39, which accepts as input via transmit/receive buffer 37 universal SDCI data from the data acquisition device 20. A host parameter buffer 38 stores host parameter data fetched during power up initialization from the data acquisition device 20. The host format and protocol translation means uses the data from the parameter buffer 38 to appropriately configure data in the format required by the host device 40. In particular, upon power-up, the interface cable 30 transmits upon request a host ID code from a host ID buffer 43 to the data acquisition device 20 via the SDCI protocol. The data acquisition device 20 receives the host ID code and searches the parameter memory 26 to see if the user had previously entered application-specific parameters. When the system is powered up for the first time, the parameter memory 26 will be cleared (all data bits set to zero), and the system 10 will operate in a preprogrammed default mode. As such, the system needs no information from the data acquisition device 20 in order to perform communications between the data acquisition device 20 and the host device 40 since the host-specific interface cable 30 will be matched to the particular host device 40 in use via the host format and protocol translation means.

When the user desires to change any or all of the preprogrammed default values for operating parameters of the interface cable 30, he does so for example by scanning a preprinted parameter bar code accompanying the system 10. As with scanner parameters previously described, the decoder 24 detects that the bar code scanned is a parameter bar code and not data, and the decoder 24 routes the scanned parameter along with a host identification tag (e.g. HOST 001) to an empty location in memory 26. The entire set of host parameters is also transmitted to the host interface cable 30 and stored in the buffer 38 for subsequent use. In the preferred embodiment, the buffer 38 is a volatile memory (i.e. RAM) in order to reduce cost.

The next time the system 10 is powered up, the interface cable 30 upon request sends its host ID code to the data acquisition device 20, which is used in a search of the memory 26 for any host parameters which had been previously entered and stored. When a match is found between the host ID code and a location in memory 26, the parameter data is fetched and sent to the interface cable 30 via the SDCI bus 32 for storage in the parameter buffer 38. Thus, once the user has reconfigured the operation of the interface cable 30 with a particular data acquisition device 20, the system 10 operates in the same fashion every time until the user re-programs the parameters.

Figure 4:
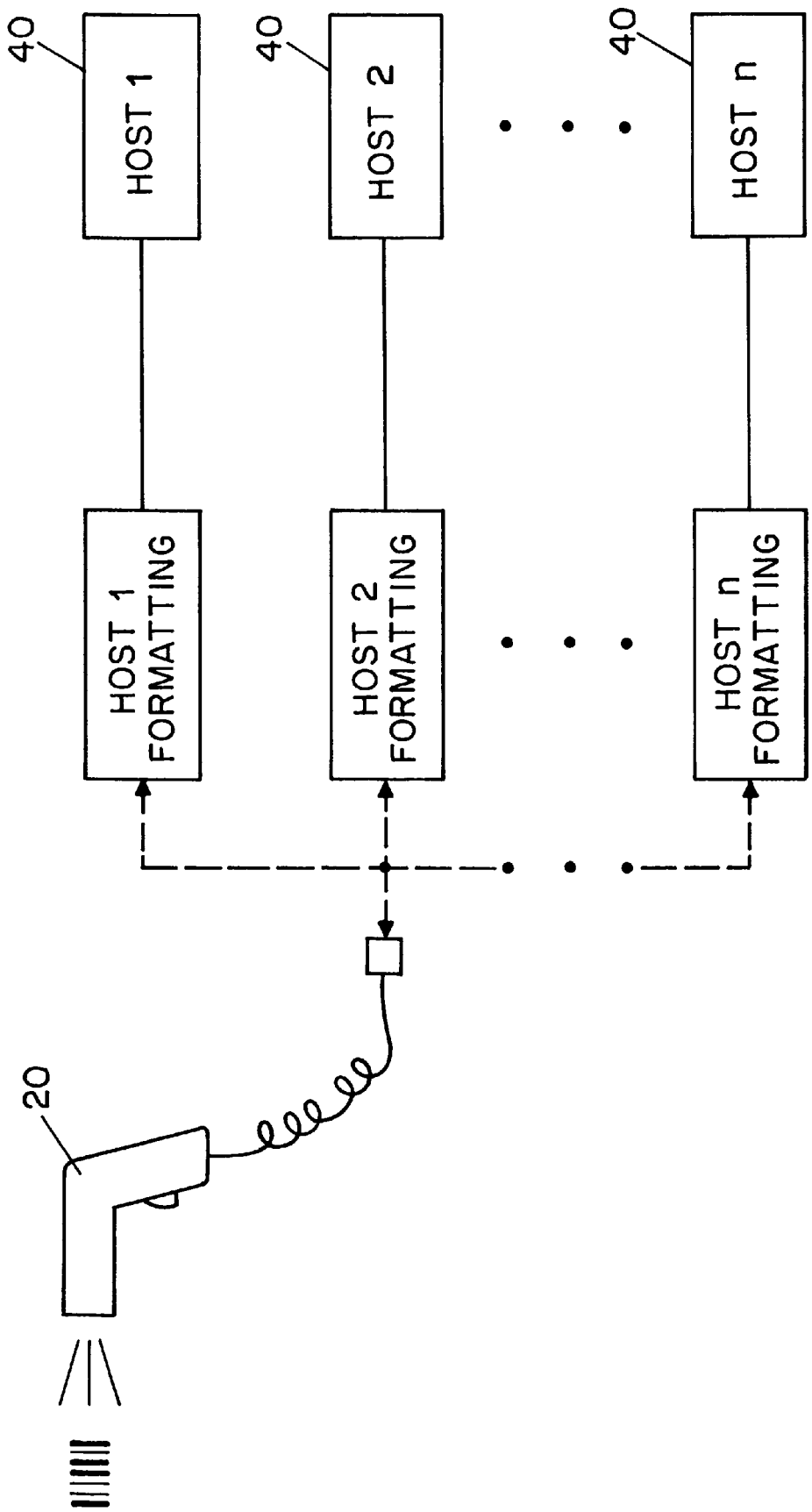
FIG. 4 illustrates an application of the system in which a data acquisition device may connect with a plurality of host interfaces.

Advantageously, as shown in FIG. 4, the user may utilize the data acquisition device 20 with a different host device 40 at, for example, a different location in the workplace. The host parameter memory 26 will store the user-scanned parameters in a different location, and the interface cable 30 of the second system will send its own unique ID code to request its parameters. Thus, the data acquisition device 20 can be taken from system to system, wherein each host device has an associated interface cable 30 connected thereto, and the data acquisition device will instruct the interface cable 30 to operate in the manner desired by the user with the user only having to scan a parameter bar code only once for each particular system.

The system 10 of the present invention advantageously implements a set of default parameters wherein each default value is set to logical 0. The memory 26 stores multiple parameters in the same location for a given interface cable 30. By scanning a particular parameter bar code, only that parameter is changed and the remaining parameters are left at the default of 0. By using 0 as defaults, the data acquisition device 20 does not have to store default tables as was required in the prior art. Additionally, the device 20 will "know" the defaults for all cables designed and used in the future. That is, by using a universal default parameter setting of all 0's, data acquisition devices may be designed to operate in conjunction with currently existing cables and, similarly, cables in the future may be designed to operate with existing data acquisition devices.

The SDCI protocol implemented between the data acquisition device 20 and the host interface cable 30 in the preferred embodiment of the present invention will now be described in detail. Communications between the data acquisition device 20 and the host interface cable 30 are carried out on a two-line serial interface. Thus, no matter which host-specific cable 30 is used, the communications between the data acquisition device 20 and the host interface cable 30 are the same. This is made possible by the flexibility of the parameter structure and the host directives to be described herein. All data sent between the data acquisition device 20 and the host interface cable 30 are done with one of the following opcodes.

The following Table A is a list of all the opcodes supported by the SDCI protocol in the preferred embodiment of the present invention. Table A identifies the source device (data acquisition device 20 or interface cable 30) allowed to send a message of that type. Opcodes designated with the type "cable" (C) means that only the cable 30 can transmit that set of opcodes. Similarly, "data acquisition" (D) type opcodes can only be transmitted by the data acquisition device 20, and "cable/data acquisition" (C/D) types can be transmitted by both the cable 30 and the data acquisition device 20 as required.

TABLE A

SDCI OPCODES

| Name | Class | Source | Description |
|---|---|---|---|
| ADF_DATA | Data | D | Acquired data in ADF packet format |
| ATTENTION | Control/Status | C | Inform data acquisition device of cable presence |
| BEEP | Control/Status | C | Request the data acquisition device to sound the beeper |
| BEEP_DIRECT | Control/Status | C | Tell Data Acquisition device how beeper parameters should be set |
| CMD_ACK | Control/Status | C/D | Positive acknowledgment of received packet |
| CMD_NAK | Control/Status | C/D | Negative acknowledgment of received packet |
| DCU_DATA | Data | C/D | Data Acquisition Device Customization Utility Parameter Buffer |
| DCU_REQUEST | Control/Status | C/D | Request Data Acquisition Device to Send all its parameters out as DCU DATA |
| DECODE_DIRECT | Control/Status | C | Tell Data Acquisition Device how decode parameters should be set |
| ID_REPLY | Control/Status | C | Send cable ID string to Data Acquisition Device |
| ID_REQUEST | Control/Status | D | Ask Cable/Host for its ID string |
| LEDOFF | Control/Status | C | Request the data acquisition device to deactivate LED output |
| LEDON | Control/Status | C | Request the data acquisition device to activate LED output |
| PARAM_DATA | Data | D | Anonymous Parameter Data |
| POLL | Control/Status | D | Confirms Cable presence after configuration |
| RESET | Control/Status | D | Requesting the cable to start the configuration process |
| SCALE_DATA | Data | D | Data from weight scale via data acquistion device |
| SCALE_REQUEST | Control/Status | C | Request to Data Acquisition Device to send weight scale data |
| SCAN_DISABLE | Control/Status | C | Prevent the operator from scanning bar codes |
| SCAN_ENABLE | Control/Status | C | Permit the operator to scan a bar code |

TABLE A-continued

SDCI OPCODES

| Name | Class | Source | Description |
|------|-------|--------|-------------|
| SLEEP | Control/Status | C/D | Request to place the data acquisition device or cable into low power |
| START_DECODE | Control/Status | C | Tell Data Acquisition Device to attempt to decode a bar code |
| STOP_DECODE | Control/Status | C | Tell Data Acquisition Device to abort a decode attempt |
| TYPE_LEN_DIRECT | Control/Status | C | Tell Data Acquisition Device how to set its Code Type and Length parameters |

Note: D = Data Acquisition Device, C = Cable, C/D = Cable/Data Acquisition Device The cable 30 and the data acquisition device 20 exchange the messages in Table A in data packets. A packet is a collection of bytes framed by the proper SDCI protocol formatting bytes. The maximum number of bytes per packet allowed by the SDCI protocol for the transmission of data to the cable for any transaction is specified by the cable in the ID_REPLY message as described below. The following Table B is the general packet format for SDCI messages, and descriptions of fields that occur in all messages.

TABLE B

Packet Format
<PAL><OPCODE><MESSAGE SOURCE><STATUS><DATA AND OTHER PARAMETERS><CHECKSUM>

Field Descriptions

| Field Name | Format | Sub-Field | Meaning |
|------------|--------|-----------|---------|
| PAL (Protocol and Length Field) | Bits 0 to 6 | Length | Length of message not including the check sum bytes. |
| | Bit 7 | Class | 0 = data<br>1 = control/status |
| OPCODE | 1 Byte | See Table A | Identifies the type of packet data being sent |
| MESSAGE SOURCE | 1 Byte | 0 = Data Acquisition Device<br>3 = Cable | Identifies where the message is coming from |
| STATUS | Bit 0 | Retransmit | 0 = First time packet is sent<br>1 = Subsequent transmission attempts |
| | Bit 1 | Continue | 0 = Last packet<br>1 = Data continued with next packet(s) |
| | Bit 2 | Low battery power | |
| DATA AND OTHER PARAMETERS | Variable number of bytes | | The data sent in the field varies in accordance with the particular message |
| CHECKSUM | 2 Bytes | 2's complement sum of message contents excluding checksum | Checksum of message |

Major SDCI Messages and Transactions

The data transactions which occur among the data acquisition device 20, the interface cable device 30, and the host device 40 are now described in detail. As used herein, the term "packet transmitter" refers to the device which is currently transmitting a data packet, and the term "packet receiver" refers to the device which is currently receiving a data packet. For a given data transaction, the appropriate opcodes set forth in Table A are exchanged among the aforementioned devices as shown in FIGS. 3(a) through 3(e). In addition, for each opcode sent, the CMD_ACK and CMD_NAK opcodes (positive acknowledgment of received packet and negative acknowledgment of received packet, respectively) are sent by the packet receiver to the packet transmitter to indicate the status of the received data packet. The CMD_ACK opcode is sent by the packet receiver when the received data packet passes a checksum test and the receiver successfully processed the data. Likewise, the CMD_NAK opcode is sent by the packet receiver when the received data packet fails the checksum test or some other error occurred while handling the message.

Power-up Initialization

Figure 3A:
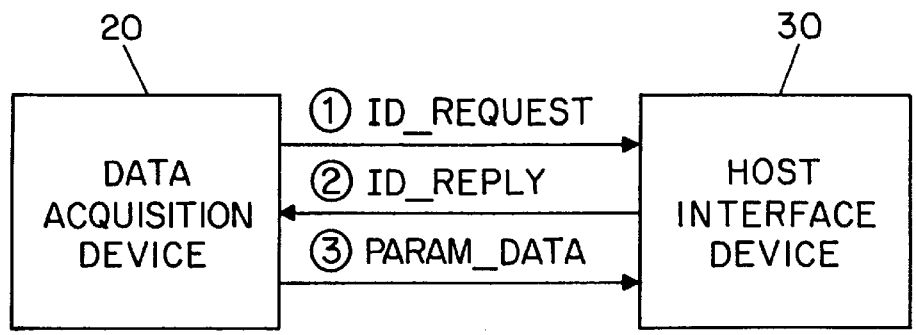
Figure 3B:
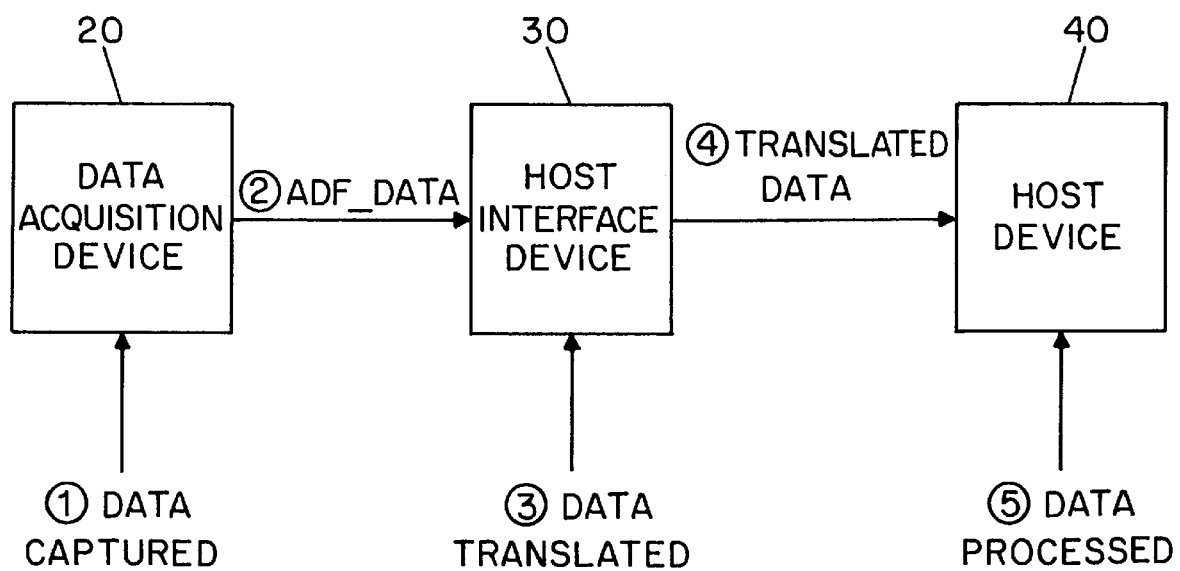
Figure 3C:
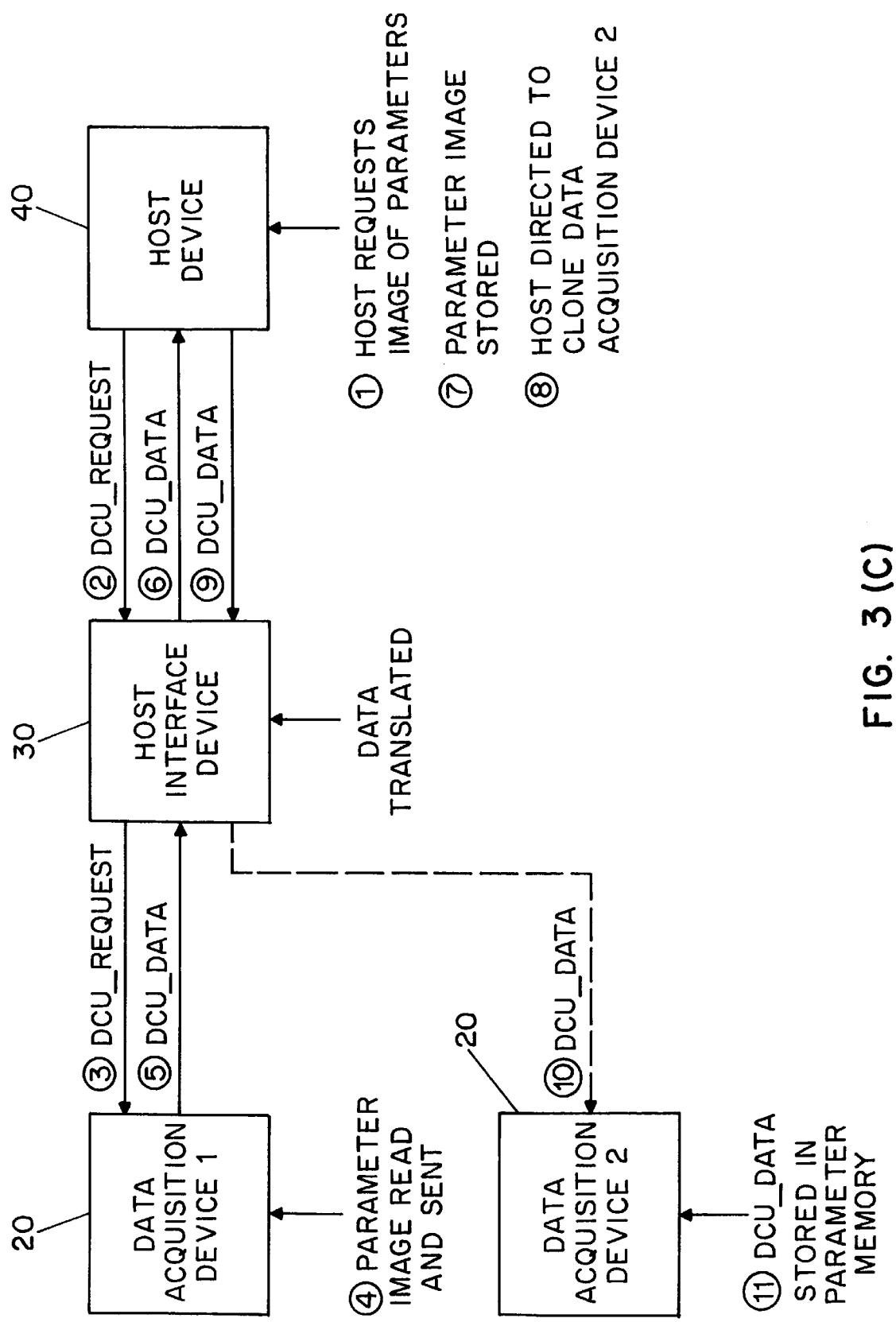

FIG. 3(a) illustrates the initialization data transaction implemented by the SDCI system. Upon power-up, the ID_REQUEST opcode is sent by the data acquisition device 20 to the interface cable 30, which directs the interface cable 30 to send a unique identification string which is stored in its host ID buffer 43. This unique cable/host ID is used to identify the particular cable/host to which the data acquisition device is communicating. The <DATA AND OTHER PARAMETERS> field is empty in the ID_REQUEST opcode since this opcode is simply a command to the cable 30.

Upon successful receipt of ID_REQUEST, the cable 30 will respond by sending the unique ID in an ID_REPLY opcode. The unique ID is fetched from the host ID buffer 43 and inserted into the <DATA AND OTHER PARAMETERS> field. Also inserted in the <DATA AND OTHER PARAMETERS> field are other system parameters such as the cable release version (to ensure software compliance), the maximum massage length accepted by the cable 30 (including the checksum), the minimum wait time that the data acquisition device 20 should wait for the cable to issue a CMD_ACK or CMD_NAK response to an ADF_DATA message, the output decode type (for data acquisition devices with bar code scanning capabilities) which specifies if the data should be in intermediate scan data (binary image of bar code) or ASCII format, a flag to indicate whether the cable 30 will support continued ADF_DATA messages for long data transmissions, and the size of the cable's anonymous parameter buffer.

Upon receipt of the ID_REPLY opcode from the cable 30, the data acquisition device 20 will use the unique ID word and search the parameter memory 26 to see if parameters have been previously stored for that particular cable/host configuration. If the data acquisition device finds a match and thus has parameters to send to the cable 30, it will load them into the <DATA AND OTHER PARAMETERS> field of a PARAM_DATA message and send it to the cable 30. If no match is found, indicating that no parameters have been loaded for that particular cable/host configuration, then a set of default values (i.e. all zeroes) will be sent in the PARAM_DATA message.

Although not illustrated in FIG. 3(*a*), the RESET and ATTENTION opcodes, which are described in more detail further below, are instrumental in ensuring a proper initialization handshake sequence occurs.

Transfer of Acquired Data

The ADF_DATA (Advanced Data Formatting) opcode is used to transmit data entered into the data acquisition device 20. When the data acquisition device 20 comprises bar code scanning capabilities as in the preferred embodiment system shown in FIG. 1, this opcode is used in order to transport decoded bar code data to a host device 40 via the interface cable 30. Referring to FIG. 3(*b*), data is captured by the bar code scan engine 22, decoded by the decoder 24, and sent via the ADF_DATA message to the cable device 30. Upon receipt of this message, the host format and protocol translation means 39 in the cable 30 will format the data in conjunction with the host parameter buffer 38 for transmission to the host device 40 and send the data to the host. If the transfer of data to the host is successful, a CMD_ACK is sent to the data acquisition device 20; otherwise a CMD_NAK is sent that indicates what failed.

The <DATA AND OTHER PARAMETERS> field of the ADF_DATA message contains data which identifies the bar code type being sent as well as the decoded data itself. The format of this field is:

```
<data type><length><data><data type><length><data> . . .
    <EOB>
```

The ADF data field must end with a zero <EOB> byte which indicates the end of the ADF data stream.

In particular, in the ADF protocol, the bar code type indicates the particular symbology of the decoded data, such as EAN 8, EAN 13, Code 39, Codabar, UPC, Code 128, etc. The data type field indicates whether the transmitted data is ASCII, ALT-Shifted, Numeric, Extended Keypad, etc., as required by a particular system application. When the data acquisition device 20 needs to send an ADF_DATA message that is longer than the length that the cable will accept, then the data is sent in smaller packets. If an ADF_DATA message is going to be continued by one or more messages, then the "continue" bit should be set in the status field (see Table A above). The continue bit shall be set for all ADF data packets that make up the message until the last piece, which has the continue bit cleared. This indicates that the continued message is complete with the last packet. When a cable 30 has indicated in its ID_REPLY message that it does not accept continuations of data packets, then the data acquisition device 20 does not send any ADF_DATA to the cable if it cannot fit the entire data packet in one ADF_DATA message.

Cloning of Data Acquisition Device Parameters

The system of the present invention may be advantageously used in order to effect "cloning" of data acquisition device parameter configurations without the need for an operator to manually program, by keypad entry, bar code menu scanning or the like, data acquisition device parameters in each individual device 20. Rather, an operator may program parameters in one data acquisition device 20 and allow the parameter memory to be uploaded to a host device, where it is temporarily stored for subsequent download to a different data acquisition device 20. This a time-saving implementation of the present system which ensures that similar devices will be programmed identically without a chance for operator error from device to device.

FIG. 3(*c*) illustrates the protocol sequence implemented by the system in order to effect cloning of the data acquisition parameters. In this case, the parameters are scanner parameters which relate to the operation of the decoder 24 of a data acquisition device 20 having bar code scanning capabilities as shown in FIG. 1(*a*). Referring to FIG. 3(*c*), when the host device 40 requires the transfer of scanner parameters from the data acquisition device 20, the host will send a DCU_REQUEST (Data Acquisition Device Customization Utility Request) message to the interface cable 30. The cable 30 translates this message to SDCI format and sends DCU_REQUEST to the data acquisition device 20. The <DATA AND OTHER PARAMETERS> field in the DCU_REQUEST message specifies a request for either an image of the scanner parameters or an image of the default parameters, as required.

Upon receipt of the DCU_REQUEST, the data acquisition device 20 will load the requested parameters from the memory 26 into the <DATA AND OTHER PARAMETERS> field of a DCU_DATA message for transmitting to the cable device 30. In particular, the <DATA AND OTHER PARAMETERS> field of DCU_DATA specifies the revision level of the parameter buffer in order to ensure compatibility when cloning, the location within the parameter buffer where the image begins, and the data from the parameter buffer. DCU_DATA is received by the cable 30, translated to the format suitable for communication with the particular host 40, and sent to the host 40 for storage in a buffer 45.

When a second data acquisition device 20 is connected to the host/cable assembly for cloning of uploaded parameters, the host device 40 initiates the transfer of scanner parameters to the data acquisition device 20 by sending a DCU_DATA message to the interface cable 30. The DCU_DATA message has in its <DATA AND OTHER PARAMETERS> field the scanner parameters obtained from the initial upload. The cable 30 translates this message to SDCI format and sends DCU_DATA to the data acquisition device 20 for storage in the scanner parameter memory 26. This process can be repeated with other data acquisition devices 20 in the same fashion.

If the revision level of the parameter buffer does not match the revision level of the data acquisition device 20 then the parameter data is not written into the nonvolatile memory therein (the transfer is not completed).

In the alternative, the cloning operation described herein may be effected by the data acquisition device 20 and the cable 30 without needing the host device 40. In this instance, the user scans a predetermined "upload" bar code which is interpreted by the decoder as a command to transmit DCU_DATA to the cable device 30. The parameter data is stored in a temporary buffer in the cable 30 rather than in the host device 40 as mentioned above. The user may subsequently connect the interface cable 30 to a new device 20 and scan a second "download" bar code which is interpreted by the decoder as a command to request DCU_DATA from the temporary storgae buffer of the cable 30. The stored parameter data is sent to the data acquisition device 20 in the manner mentioned above to effect completion of the cloning operation without the need to be connected to a host device 40.

Scale Data Exchange

In the preferred embodiment system, a data acquisition device may have connected thereto a scale 60 for weighing items and providing scale data indicative of the weight to the host device 40. Referring to FIG. 3(d), the host device 40 will request scale data by issuing a request to the interface cable 30, which translates the request and sends a SCALE_REQUEST command to the data acquisition device 20. The data acquisition device 20 will read the attached scale device 60 and respond with a SCALE_DATA message. The cable 30 will translate the scale data from the SDCI format to the format required by the host device 40.

The <DATA AND OTHER PARAMETERS> field in the SCALE_REQUEST command issued by the cable device 30 indicates to the data acquisition device 20 and scale 60 the amount of time to wait for the scale to settle prior to obtaining a measurement, the units of measure (i.e. pounds or kilograms), and data which may be displayed on a display device of the scale 60. The <DATA AND OTHER PARAMETERS> field in the subsequent SCALE_DATA reply message indicates scale status (hardware error, scale not settled in required time, units of measure, weight of item over limits of scale, and/or weight of time too small to measure) and the measurement data in ASCII format.

Other SDCI Messages and Transactions

In addition to the major SDCI transactions and associated opcode messages described above, the following SDCI message opcodes are used in the preferred embodiment system.

ATTENTION

The ATTENTION opcode has a null <DATA AND OTHER PARAMETERS> field and is sent by the cable 30 during the initialization process to announce its presence to the data acquisition device. If the ATTENTION/ID_REQUEST/ID_REPLY/PARAM_DATA/process fails due to communications problems, the cable 30 will send ATTENTION repeatedly until ID_REQUEST is received. No matter what state the data acquisition device is in, the receipt of an ATTENTION message from the cable 30 will cause the data acquisition device to follow this sequence. After the data acquisition device receives the ATTENTION message, the data acquisition device will ask the cable to identify itself by an ID_REQUEST.

From the time that the data acquisition device has reset or it has received an ATTENTION message, the data acquisition device must require that the entire initialization process occurs in sequence without any errors. If any error occurs in the receipt of ATTENTION, ID_REPLY, in the transmission of RESET, ID_REQUEST or PARAM_DATA, or in the transmission of an ACK to the cable, then the data acquisition device must send a RESET to the cable. If this transmission fails, then the data acquisition device will continually send RESETs until acknowledged with an ATTENTION.

If the initialization process does not complete within two seconds, then the data acquisition device must sound a beep that identifies a problem with the cable 30. This beep should be repeated every two seconds until the problem is fixed.

BEEP

The BEEP opcode has a beep code field in the <DATA AND OTHER PARAMETERS> section. This opcode is intended to be used with those bar code scanning data acquisition devices having decoders equipped with a beeper; it instructs the decoder to sound the beep sequence indicated by the beep code byte field. The decoder should beep the sequence provided in the BEEP opcode, only if the beep sequence is supported by the decoder, and the sounding of the beep specified does not interfere with the decoder's user interface. If the decoder does not support a beeper, then this message can be ignored. The beep code field indicates, for example, a high pitch, low pitch, or combination of both as required by a particular system.

BEEP DIRECT

The BEEP_DIRECT opcode sets the frequency, duration and volume parameters in its <DATA AND OTHER PARAMETERS> section. A status field can also indicate a permanent storage bit indicating a permanent change. The decoder supports the BEEP opcode for all frequency values that it can support. The decoder shall store directive information to non-volatile storage when the permanent storage bit is set. The duration parameter is supported by decoders that have programmable durations for decode beep. Beep volume is supported by decoders that support volume setting as closely as possible.

DECODE DIRECT

This opcode is used by the cable 30 to instruct the data acquisition device 20 how decode parameters should be set, as specified by the host device 40. When a cable 30 receives directives from the host device 20 pertaining to these parameters, the cable 30 sends the directives to the decoder by using this message. The directives are transmitted in the <DATA AND OTHER PARAMETERS> field and include bar code decoding redundancy parameters, UPC security level, linear security level, laser-on timeout, laser-off timeout, laser sleep time, motor sleep time, LED blink frequency, double touch indication, and ASCII stitching.

LED OFF, LED ON

The cable 30 sends these opcodes to the decoder to turn off and on the decode LED, respectively. These opcodes have null <DATA AND OTHER PARAMETERS> fields.

POLL

This command is useful when the data acquisition device 20 has a separate power source from the cable 30, and the decoder wishes to check regularly that the cable 30 is still connected. The cable 30 must respond to the POLL message within 2 seconds, or the decoder can assume that the cable is not plugged in. The decoder may send a POLL to the cable 30 at any time, except when awaiting an acknowledgment from a previously sent message. If the cable does not respond within 2 seconds, then the decoder shall send a RESET. This opcode has a null <DATA AND OTHER PARAMETERS> field.

RESET

This opcode is sent by the decoder when a communications line failure is detected (i.e. no response over a set amount of time, or all resend attempts fail). Upon receipt of the RESET message, the cable 30 stops what it is doing and sends an ATTENTION. Upon sending RESET, the decoder continually sends RESETs at least every half second, until the cable responds with ATTENTION. This opcode has a null <DATA AND OTHER PARAMETERS> field

SCAN DISABLE, SCAN ENABLE

The cable 30 can disable and enable bar code scanning, respectively, to a data acquisition device 20 equipped with bar code scanning capability. When the decoder receives the SCAN_DISABLE opcode, it will not transmit to the host device until a subsequent SCAN_ENABLE opcode is received. At startup, the decoder assumes SCAN_ENABLE. These opcodes have null <DATA AND OTHER PARAMETERS> fields.

SLEEP

The SLEEP opcode can be sent by either the cable 30 (under command of the host device 40) or the data acquisition device 20 to tell the receiver to go into a low power mode. The host device 40 can instruct the cable device 30 to go to sleep, in which case the cable 30 goes into a low power mode and sends a SLEEP command to the data device. In addition, the data device 20 can sense via the timeout sense means 29a that data has not been collected for a certain period of time. This will put the data acquisition device 20 into a low power mode, and the data acquisition device 20 will then instruct the cable to do the same by using a SLEEP command. In either case, the system is waked up by the data acquisition device 20 sensing an attempt to input data (e.g. a trigger pull if the device 20 comprises a bar code scanner). When the cable is in sleep mode, and the decoder tries to send the cable any message, then the cable will wake up and resume operation where it left off or respond with an ATTENTION message. This may involve no more than two resend attempts on the decoder's part. Decoders that support a low power operation are required to sleep when this command is received. This opcode has a null <DATA AND OTHER PARAMETERS> field. There is no initialization process after a wake-up as there is after a cold start of the system.

START DECODE, STOP DECODE

This opcodes instruct a data acquisition device 20 equipped with bar code scanning capability to start and stop (if not yet timed out) a scan and decode session, respectively. These opcodes is interpreted by the device 20 as a trigger pull and release, respectively, or other scan initiation (i.e. object sensing). These opcodes have null <DATA AND OTHER PARAMETERS> fields.

TYPE LEN DIRECT

The <DATA AND OTHER PARAMETERS> field in this opcode indicates to a data acquisition device having bar code scanning capabilities which bar code symbologies are enabled or disabled.

Autodiscrimination of Data Transmission Parameters

An additional feature of the preferred embodiment system implements an autodiscrimination function which allows the system to automatically determine the transmission parameters of the system. This feature of the invention will be described in an exemplary manner in conjunction with a host device which communicates with an interface cable 30 in the RS-232 standard format.

To initiate the autodiscriminate function, the user scans a predetermined "autodiscriminate" bar code which is sent to the cable 30 as ADF data. The cable 30 interprets this as an autodiscriminate command an enters a "listen" mode. The user then presses a sequence of keys on the keyboard of the host device, namely the keys "UTU" (selected to appropriately toggle the data lines). The "UTU" data sequence is sent to the cable 30, which observes the operation of the data lines in order to automatically determine the pertinent RS-232 parameters; namely, baud rate, parity, number of data bits, stop bits, the transmit pin, and the transmission direction. The cable 30 stores these autodiscinated parameters in a local non-volatile memory and uses these parameters to configure subsequent communications with the host device 40.

The system 10 of the present invention may advantageously be used for bi-directional control of either the host device 40 or the data acquisition device 20. In addition to requesting and accepting scale data from the data acquisition device 20 and accepting acquired (i.e. decoded) data, the host device 40 can be used to enter control commands to be sent to the data acquisition device 20. This includes the use of the host's keyboard 47 to enter data acquisition device parameters which are stored in the memory 26. In addition, host operating parameters can be entered via the host keyboard 47 and sent to the data acquisition device 20 for storage in memory 26.

In addition, the data acquisition device 20 can be used to control or configure the host device 40. The user either enters via the keypad 23 or, if applicable, by scanning a special bar code, the required control command/data for transmission to the host device 40.

FIG. 5 illustrates an alternative embodiment of the invention in which dedicated host formatting modules 51, 52 and 53 are included in a data acquisition device 20 along with the universal data formatting means 27. Acquired data is input to each module 51, 52, 53 and 27, and the output of one is selected via a multiplexer 50 for transmission by the transmit/receive buffer 28. When any of the dedicated host interface modules 51, 52 or 53 is used, the connector 12 is connected directly to the host device. When the device 20 is used with a host device 40 not compatible with any of the available host interface modules 51, 52, or 53, and the universal data formatting means 27 is used to provided SDCI interface, then the connector 12 is inserted into a host interface cable 30, for translation as set forth above.

What is claimed is:

1. In a bar code scanning system including a bar code scanner for providing digital control signals indicative of scanned data for transmission to a host device, said host device having host-specific input/output data format requirements, said bar code scanning system comprising:

(a) universal data exchange means located in the bar code scanner for providing said digital control signals in a universal data exchange format independent of the data format requirements of the host device; and (b) a host interface module externally coupled between said bar code scanner and said host device, for transmitting acquired digital control signals from said bar code scanner to said host device, said interface module comprising means for translating said digital control signals from said universal data exchange format to said host-specific input/output data format requirements.

* * * * *